(12) United States Patent
Ahvenainen

(10) Patent No.: US 7,899,986 B2
(45) Date of Patent: Mar. 1, 2011

(54) METHOD AND SYSTEM FOR CONTROLLING A HARD DISK DRIVE USING A MULTIMEDIACARD PHYSICAL INTERFACE

(75) Inventor: Marko Ahvenainen, Ruutana (FI)

(73) Assignee: Nokia Corporation, Espoo (FI)

( * ) Notice: Subject to any disclaimer, the term of this patent is extended or adjusted under 35 U.S.C. 154(b) by 1369 days.

(21) Appl. No.: 11/272,021

(22) Filed: Nov. 9, 2005

(65) Prior Publication Data

US 2006/0101199 A1 May 11, 2006

Related U.S. Application Data

(60) Provisional application No. 60/626,600, filed on Nov. 10, 2004.

(51) Int. Cl.
G06F 12/00 (2006.01)
G06F 3/00 (2006.01)
G06F 13/12 (2006.01)

(52) U.S. Cl. .................... 711/112; 710/10; 710/11; 710/71

(58) Field of Classification Search ............... 711/112; 710/10, 11, 71
See application file for complete search history.

(56) References Cited

U.S. PATENT DOCUMENTS 5,321,817 A * 6/1994 Feinstein ................. 703/25
5,928,347 A * 7/1999 Jones ..................... 710/305
6,145,046 A * 11/2000 Jones ..................... 710/301
6,480,932 B1 * 11/2002 Vallis et al. ............. 711/112
6,735,650 B1 * 5/2004 Rothberg ................ 710/74
2002/0073376 A1 * 6/2002 Otake et al. ............ 714/758
2003/0185290 A1 * 10/2003 Coker et al. ............ 375/222
2005/0097263 A1 * 5/2005 Wurzburg ............... 711/103
2005/0262297 A1 * 11/2005 Arakawa et al. ........ 711/112
2007/0101095 A1 * 5/2007 Gorobets ................ 711/203

FOREIGN PATENT DOCUMENTS

WO WO 0210901 A2 * 2/2002

\* cited by examiner

*Primary Examiner*—Kevin L Ellis
*Assistant Examiner*—Mehdi Namazi
(74) *Attorney, Agent, or Firm*—Ware, Freesola Van Der Sluya & Adolphson, LLP

(57) ABSTRACT

A method and system for data transfer between a sector-oriented mass storage medium and a host device capable of interfacing with a byte-oriented storage medium using an HS-MMC physical interface in the host device. Existing MMC commands such as FAST_IO command can be used to pass the control data to the sector-oriented mass storage medium and also to read the status of that medium. It is possible to use the GEN_CMD command for data transfer, for example. Because the command in data transfer is similar to ATA protocol, ATA write commands and ATA read commands can also be used for data transfer to and from the sector-oriented mass storage medium.

26 Claims, 2 Drawing Sheets

METHOD AND SYSTEM FOR CONTROLLING A HARD DISK DRIVE USING A MULTIMEDIACARD PHYSICAL INTERFACE

The present application is based on and claims priority to U.S. Provisional Patent Application Ser. No. 60/626,600, filed Nov. 10, 2004.

FIELD OF THE INVENTION

The present invention relates generally to a MultiMediaCard (MMC) and, more specifically, to the interface between an MMC host device and a hard disk drive.

BACKGROUND OF THE INVENTION

A mass storage device, such as a hard disk drive (HDD), uses an ATA protocol through a physical interface such as IDE. Such a mass storage device has a controller that is integrated into the device itself. The ATA protocol is based on 8 bit registers (ATA task file) into which the command to be executed, together with the parameters needed, are written. The status of the device, as well as the possible error codes, is read from these registers. Payload data is traditionally also written to and read from these registers. Below is the list of the registers as described in the ATA specification.

| When read | When written |
|---|---|
| Command Block registers | |
| Data | Data |
| Error | Features |
| Sector Count | Sector Count |
| LBA Low | LBA Low |
| LBA Mid | LBA Mid |
| LBA High | LBA High |
| Device | Device |
| Status | Command |
| Control Block registers | |
| Alternate Status | Device Control |

The absolute IO address of the above mentioned registers is specific to the environment to which the device is connected. There is a de facto standard address space for the IDE usage in the PC environment. For PC-Card implementation there is a multiple addressing scheme that can be used. However, for MMC implementation, it is desirable to keep the physical interface of the HS-MMC in conformity to these existing address mappings, if possible, in order to keep the driver implementation as close as possible to the existing IDE/ATA drivers.

SUMMARY OF THE INVENTION

It is a primary objective of the present invention to harmonize the HS-MMC physical interface with current ATA interface and control. It is also the objective of the present invention to use as much as possible the existing driver software for the MMC and the HDD. Using the ATA type of control renders it possible to use devices that have storage capacity greater than 4 Gbytes. The current MMC addressing method is inadequate in using such devices. The present invention provides a method for using the HS-MMC physical interface to control a sector oriented mass storage medium, such as a hard-disk drive. According to the present invention, existing commands, such as the FAST_IO command, are used in a new way. The FAST_IO command is used to pass the control data to the HDD and also to read the status from the HDD. Using the MMC specific data handling for payload data transfers, according to the present invention, significantly improves the data transfer performance between a byte-oriented memory medium and a sector-oriented mass storage medium. The approach also solves the current 4 GByte restriction associated with the MMC. Because the command in data transfer is similar to the ATA protocol, the required work needed for the device drive software is greatly simplified. While there are different ways to handle READ BLOCK, it is possible to use the GEN_CMD (CMD56) for data transfer. However, there are many ATA read commands that can be selected for data transfer from the ATA device, and many ATA write commands can be selected for data transfer to the ATA device. The selection of the ATA read and write commands can be application and/or implementation specific. With the present invention, it is not necessary to modify the current MMCA Specification.

DETAILED DESCRIPTION OF THE INVENTION

Figure 1:
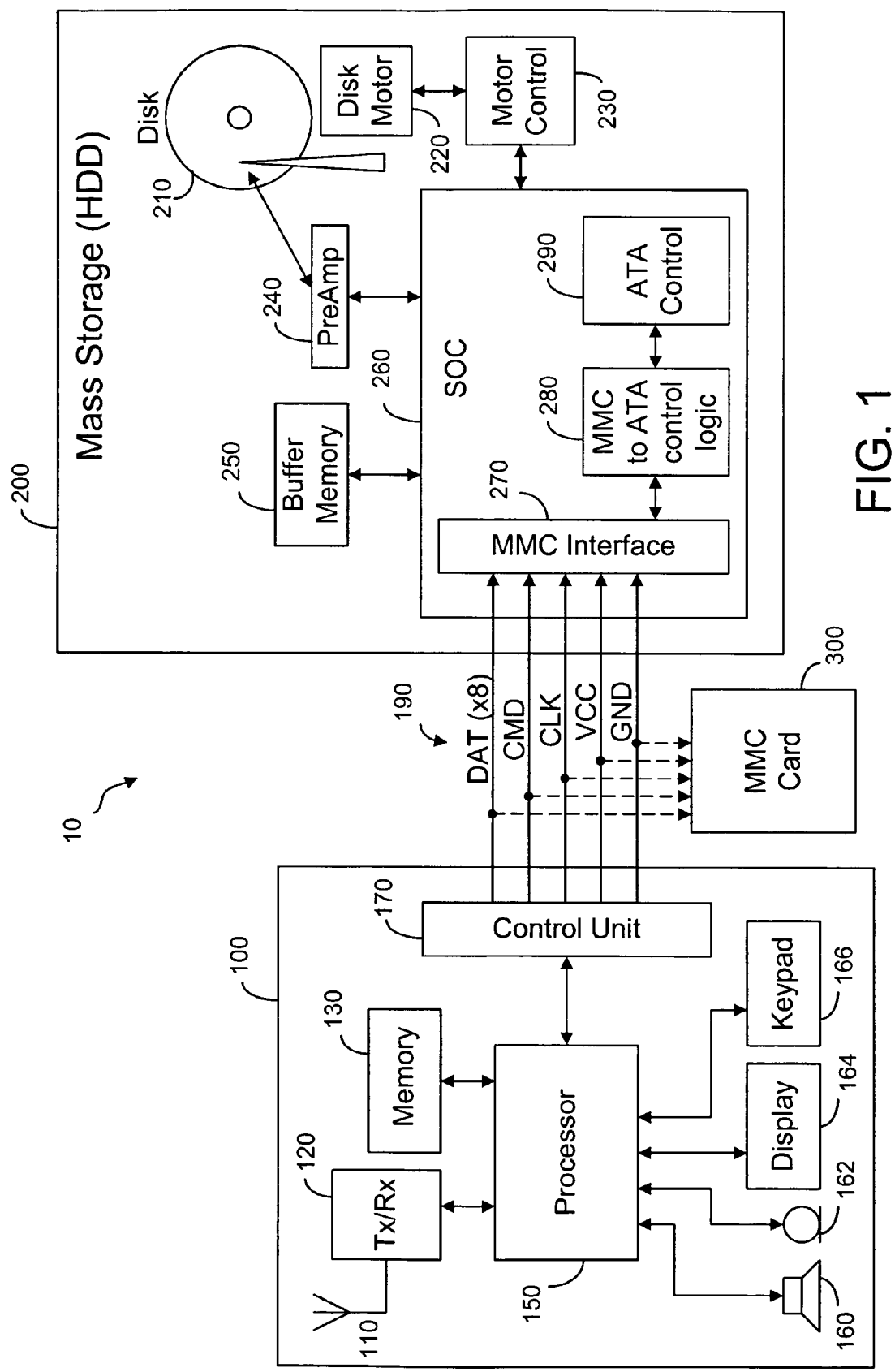
FIG. 1 is a block diagram showing a system having a host device with an MMC interface connected to a hard-disk drive, according to the present invention.

It is known that the MMC command set offers many high-level commands that deal with initialization and configuration, data transfer (block, multi-block and stream), and erasure and write protection. In the MMC command set, CMD39, or FAST_IO command is used to access application-specific (non-MMC) registers. In particular, the FAST_IO command is used for reading from or writing to an 8-bit application specific register. The register index parameter is 7 bits and thus permits the use of 128 individual registers. Since the IO address space using FAST_IO is only 128 addresses, the use of the IDE primary/secondary mapping (address spaces 0x1F0 ... 0x1F7, 0x3F6 ... 0x3F7, 0x170 ... 0x177, 0x376 ... 0x377) cannot be used. However, it is possible to use an addressing scheme that carries out contiguous I/O mapping with the base address of 0x00. This gives us the following register addresses:

| When read | Address | When written |
|---|---|---|
| Command Block registers | | |
| Data | 0x00 | Data |
| Error | 0x01 | Features |
| Sector Count | 0x02 | Sector Count |
| LBA Low | 0x03 | LBA Low |
| LBA Mid | 0x04 | LBA Mid |

-continued

| When read | Address | When written |
|---|---|---|
| LBA High | 0x05 | LBA High |
| Device | 0x06 | Device |
| Status | 0x07 | Command |
| Control Block registers | | |
| Alternate Status | 0x0E | Device Control |

Other mappings are also possible although they may require more changes to the existing driver implementations.

For consistency, it is possible also to use the FAST_IO command for payload data transfer. However, this would lead to unacceptable command/data overhead. Thus, it is more desirable to use another existing command in the MMC such as the GEN_CMD (CMD56).

The GEN_CMD is normally used for MMC data transfer in cases where there is no need for specifying the address for the data transfer. There is a one-bit parameter in the command to specify whether the data is to be written or to be read. The major advantage of this approach is that it does not require new or modified commands to the current MMC specification. Also it maintains the compatibility with the current IDE/ATA interface. It should be noted that a new, dedicated command for use in data transfer is also possible.

If there is a possibility to make some modifications to the MMC System Specification then it would be more efficient to execute GEN_CMD (CMD56) as a multiple block command for data transfer. As such, the transfer block length (set by CMD16) can be set to match the sector size of the drive. Consequently, the sector count in the ATA command block register equals the amount of data to be transferred.

Read Block

While there are different ways to handle READ BLOCK, it is possible to use CMD56 for data transfer as follows:

The sequence required for reading one 4 kByte block, from the LBA address 0x123456 from the disk is described below. It is assumed that the Command Block registers are allocated starting from the IO register index 0x00.

| Command | Argument | Response | Data bus | Notes |
|---|---|---|---|---|
| CMD16 | Block length 0x1000 | Command status | None | Write block length information for the following CMD56 read command |
| CMD39 | Write flag set, register address 0x02, register data 0x08 | Ignored | None | Write Sector Count register value 8 |
| CMD39 | Write flag set, register address 0x03, register data 0x56 | Ignored | None | Write LBA Low |
| CMD39 | Write flag set, register address 0x04, register data 0x34 | Ignored | None | Write LBA Mid |
| CMD39 | Write flag set, register address 0x05 register data 0x12 | Ignored | None | Write LBA High |
| CMD39 | Write flag set, register address 0x06 register data 0xE0 | Ignored | None | Write Device register |
| CMD39 | Write flag set, register address 0x07 register data 0x20 | Device Status | None | Write Command, 0x20 for Read Sectors |
| CMD56 | RD/WR bit set indicating a read command | Command status with busy indication | 4kByte block of data from LBA address 0x123456 | Read the data from the MMC data bus. Pulling the data bus low indicates device busy. |

It is also possible that other read commands as defined in the ATA specification be selected for reading data from the HDD, instead of using ATA command Read Sector (0x20). For example, it is possible to use Read DMA (0xC8). Choosing the ATA command that is used for data transfer from the ATA device may be implementation/application specific and may affect the usage of the following MMC data transfer command (CMD56).

Write Block

Writing a block to the mass storage device is basically the same as reading from it, with the following exceptions:
1. Command register must be written with a Write Sectors command (0x30). As with READ BLOCK, it is possible that other write commands as defined in the ATA specification be selected for writing data to the HDD, instead of using ATA command Write Sectors (0x30). Choosing the ATA command that is used for data transfer to the ATA device may be implementation/application specific and may affect the usage of the MMC data transfer command (CMD56).
2. The RD/WR bit in the CMD56 must be cleared to 0 to indicate the data write; and
3. Data blocks that are written are acknowledged with CRC status followed by the device busy.

Different Embodiments

It is possible that, instead of writing the control bytes using CMD39 (FAST_IO), the command and the associated parameters be sent using a defined data block on an MMC data bus. This approach reduces significantly the command overhead (needed clock cycles). This procedure includes:

sending of CMD16 (SET_BLOCKLEN) for setting up the block length (to 6 bytes) and receiving the response;

sending the CMD24 (WRITE_BLOCK) to initiate the write and receiving the response; and writing the 6 bytes of data including the CRC and receiving the CRC status for the transfer.

This solution requires a specific status register READ since the response as such is not able to provide the needed information.

It is also possible to define a new command for sending more than one register parameter at the time. This new command can be used for filling the task file registers, for example.

FIG. 1 is a block diagram showing how a host device having an HS-MMC physical interface is connected to a sector oriented mass storage medium. As shown in FIG. 1, the system 10, according to the present invention, comprises a host device, such as a wireless terminal 100 operatively connected to a sector oriented mass storage medium, such as a hard-disk drive (HDD) 200 through bus 190. Typically, the wireless terminal 100 comprises a processor 150 and a memory 130. The memory may comprise different memory blocks, such as a ready-only memory (ROM), and a random-access memory (RAM). The processor 150 is operatively connected to a display 164, a keypad 166, a speaker 160 and a microphone 162 to facilitate user interaction. The processor 150 is also connected to an RF front-end 120 and an antenna 110 for wireless communications. The wireless terminal 100 has a control unit 170 with a number of bus lines 190 capable of interfacing with a memory device such as a memory card 300. According to the present invention, the same bus 190 can be connected to the mass storage medium 200 through a disk interface module 260. Through the MMC-to-ATA control logic 280 and ATA control module 290, the host device 100 can communicate with and transfer data to and from the mass storage device 200 through the MMC interface 270. The disk interface module 260 is operatively connected to a motor control module 230 to control the disk motor 220 which drives the disk 210. READ and WRITE data between the disk 210 and the disk interface module 200 is conveyed through a pre-amplifier 240. The HDD 200 also has a buffer memory 250 for data buffer during READ and WRITE.

In sum, the basic MultiMediaCard IF, as used in the memory card, is random accessible and byte oriented. The MMC IF is not the best possible solution for sector oriented medium, such as HDD. Furthermore, the basic MMC interface has a capacity restriction of 4 GBytes.

Figure 2:
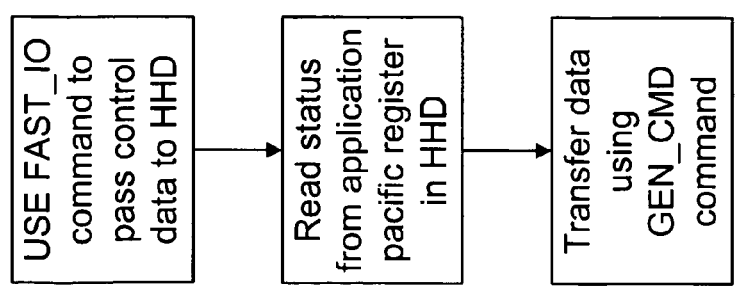
FIG. 2 is a flowchart showing the method of using the HS-MMC physical interface to control a sector oriented mass storage medium, according to the present invention.

The present invention provides a method for using the HS-MMC physical interface to control a sector oriented mass storage medium, such as a hard-disk drive. With the present invention, it is not necessary to modify the current MMCA Specification. The method for transferring data between a byte-oriented memory device to a sector-oriented storage medium, according to the present invention, comprises the steps of: using a first selected command in the byte-oriented memory device to pass control data to an application specific register in the sector-oriented storage medium; reading the status from the application specific register in the sector-oriented storage medium, wherein the passing of control data and the reading of the status are carried out in an 8-bit fashion; and using a second selected command for payload data transfer between the byte-oriented memory device and the sector-oriented storage medium. The first selected command can be a FAST_IO command, and the second selected command can be a GEN_CMD command, as shown in FIG. 2. Using the MMC specific data handling for payload data transfers, according to the present invention, significantly improves the data transfer performance between a byte-oriented memory medium and a sector-oriented mass storage medium. The approach also solves the current 4 GByte restriction associated with the MMC. Because the command in data transfer is similar to the ATA protocol, the required work needed for the device drive software is greatly simplified. While there are different ways to handle READ BLOCK, it is possible to use the GEN_CMD (CMD56) for data transfer. However, there are many ATA read commands that can be selected for data transfer from the ATA device, and many ATA write commands can be selected for data transfer to the ATA device. The selection of the ATA read and write commands can be application and/or implementation specific.

Figure 3:
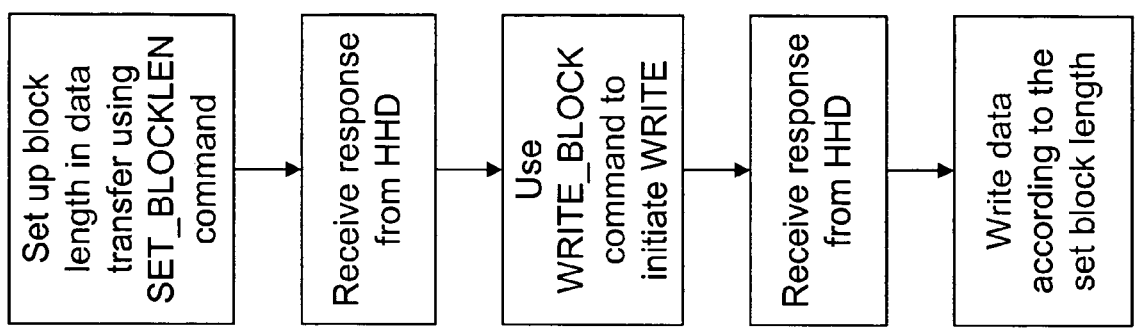
FIG. 3 is a flowchart showing the method of using the HS-MMC physical interface to control a sector oriented mass storage medium, according to a different embodiment of the present invention.

Alternatively, the transfer of data between the byte-oriented memory device to the sector-oriented storage medium can be started with sending of CMD16 (SET_BLOCKLEN) for setting up the block length (to 6 bytes) and receiving the response; sending the CMD24 (WRIRTE_BLOCK) to initiate the write and receiving the response; and writing the 6 bytes of data including the CRC and receiving the CRC status for the transfer. Subsequently, a second selected command such as GEN_CDD command is used for payload data transfer between the byte-oriented memory device and the sector-oriented storage medium, as shown in FIG. 3.

It is possible to use CE-ATA new command (CMD61) for transferring payload data. It is also possible to use standard "flash access" commands CMD11/CMD18 (for read) and CMD20/cMD25 (for write) omitting the address parameter.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method comprising:
   using at least a first selected command for a byte-oriented memory device to set up an environment in a sector-oriented storage medium; and
   transferring payload data between the byte-oriented memory device and the sector-oriented storage medium using a second selected command, wherein the second selected command is selected from commands for the byte oriented memory device or commands for the sector-oriented storage medium.

2. The method of claim 1, wherein said at least first selected command is configured to pass control data to an application specific register in the sector-oriented storage medium and to read a status from the application specific register in the sector-oriented storage medium, wherein the passing of control data and the reading of the status are carried out in an 8-bit fashion.

3. The method of claim 2, wherein said at least first selected command is configured for accessing the application specific register.

4. The method of claim 2, wherein said second selected command is configured for transferring the payload data without specifying an address for said transferring.

5. The method of claim 3, wherein said second selected command is configured for transferring the payload data without specifying an address for said transferring.

6. The method of claim 1, wherein said at least first selected command comprises: a command to set up a block length; and a command to initiate a write procedure so as to write data in said block length to the sector-oriented storage medium.

7. The method of claim 6, wherein said command to set up the block length is a SET_BLOCKLEN command and said command to initiate the write procedure is a WRITE_BLOCK command.

8. The method of claim 1, wherein the sector-oriented storage medium has a plurality of task file registers, said method further comprising
   sending a command from the byte-oriented memory device to the sector-oriented storage medium for filling the task file registers.

9. The method of claim 1, wherein the second command is CMD61 command.

10. The method of claim 1, wherein the second command is selected from a plurality of commands in accordance with advanced technology attachment (ATA) standard, the commands including CMD11, CMD18 for reading data from the sector-oriented storage medium and CMD20, CMD25 for writing data to the sector-oriented storage medium.

11. A storage module comprising:
a sector-oriented storage medium; and
an interface module operatively connected to the sector-oriented storage medium;
said interface module comprising:
a sector-oriented storage medium control module;
a byte-oriented storage medium interface; and
a control logic module connected between the byte-oriented storage medium interface and the sector-oriented storage medium control module, wherein the byte-oriented storage medium interface is adapted to receive a plurality of commands from a host device and wherein the commands comprise at least a first command to set up an environment in the sector-oriented storage medium, and a second command to transfer payload data between the host device and the sector-oriented storage medium through the control logic module and the sector-oriented storage medium control module.

12. The storage module of claim 11, wherein said at least first command is configured to pass control data to an application specific register in the sector-oriented storage medium and to read a status from the application specific register in the sector-oriented storage medium, wherein the passing of control data and the reading of the status are carried out in an 8-bit fashion.

13. The storage module of claim 12, wherein said at least first selected command is configured for accessing an application specific register.

14. The storage module of claim 12, wherein said second selected command is configured for transferring the payload data without specifying an address for said transferring.

15. The storage medium of claim 13, wherein said second selected command is configured for transferring the payload data without specifying an address for said transferring.

16. The storage medium of claim 11, wherein said at least first selected command comprises:
a command to set up a block length; and a command to initiate a write procedure so as to write data in said block length to the sector-oriented storage medium.

17. The storage medium of claim 16, wherein said command to set up the block length is a SET_BLOCKLEN command and said command to initiate the write procedure is a WRITE_BLOCK command.

18. The storage medium of claim 11, wherein the second command is CMD61 command.

19. The storage medium of claim 11, wherein the second command is selected from a plurality of commands in accordance with advanced technology attachment (ATA) standard, the commands including CMD11, CMD18 for reading data from the sector-oriented storage medium and CMD20, CMD25 for writing data to the sector-oriented storage medium.

20. A data transfer system comprising:
a host device adapted to receive a byte-oriented memory device;
a sector-oriented storage medium; and
a bus connected between the host device and the sector-oriented storage medium, wherein the sector-oriented storage medium has an interface module adapted to receive a plurality of commands from the host device through the bus, and wherein the commands comprise at least a first command to set up an environment in the sector-oriented storage medium, and a second command to transfer payload data between the byte-oriented memory device and the sector-oriented storage medium through the bus.

21. The data transfer system of claim 20, wherein said at least first command is used to pass control data to an application specific register in the sector-oriented storage medium and to read a status from the application specific register in the sector-oriented storage medium, wherein the passing of control data and the reading of the status are carried out in a 8-bit fashion.

22. The data transfer system of claim 21, wherein said at least first selected command is configured for accessing an application specific register.

23. The data transfer system of claim 21, wherein said second selected command is configured for transferring the payload data without specifying an address for said transferring.

24. The data transfer system of claim 22, wherein said second selected command is configured for transferring the payload data without specifying an address for said transferring.

25. The data transfer system of claim 20, wherein said at least first selected command comprises:
a command to set up a block length; and a command to initiate a write procedure so as to write data in said block length to the sector-oriented storage medium.

26. The data transfer system of claim 25, wherein said command to set up the block length is a SET_BLOCKLEN command and said command to initiate the write procedure is a WRITE_BLOCK command.

* * * * *